United States Patent
Chao

(10) Patent No.: US 10,539,186 B2
(45) Date of Patent: Jan. 21, 2020

(54) PROCESS TO CREATE A SELF-ORGANIZING SURFACE MATRIX

(71) Applicant: Kenneth K. Chao, Cedar Falls, IA (US)

(72) Inventor: Kenneth K. Chao, Cedar Falls, IA (US)

( * ) Notice: Subject to any disclaimer, the term of this patent is extended or adjusted under 35 U.S.C. 154(b) by 205 days.

(21) Appl. No.: 14/944,977

(22) Filed: Nov. 18, 2015

(65) Prior Publication Data
US 2016/0069390 A1    Mar. 10, 2016

Related U.S. Application Data

(62) Division of application No. 12/650,100, filed on Dec. 30, 2009, now Pat. No. 9,261,140.

(51) Int. Cl.
*B05D 7/14*        (2006.01)
*F16C 33/64*       (2006.01)
(Continued)

(52) U.S. Cl.
CPC .............. *F16C 33/64* (2013.01); *B05D 5/00* (2013.01); *B05D 7/14* (2013.01); *C10M 103/00* (2013.01);
(Continued)

(58) Field of Classification Search
CPC .......... B05D 5/00; B05D 7/14; C10M 103/00; C10M 177/00; F16C 33/6696; F16C 33/043
See application file for complete search history.

(56) References Cited

U.S. PATENT DOCUMENTS

| | | | |
|---|---|---|---|
| 4,505,187 A | * | 3/1985 | Burgio di Aragona ..................... F01B 3/0026 417/269 |
| 5,429,997 A | * | 7/1995 | Hebsur ............. C04B 35/58092 428/367 |

(Continued)

OTHER PUBLICATIONS

Kim et al., Hierarchical Structure of porous Silicon Nitride Ceramics with Aligned Pore Channels Prepared by Ice-Templating and Nitridation of Silicon Powder, 2015, Int. J. Appl. Ceram. Technol., 12 [5] 921-931 (Year: 2015).*

(Continued)

*Primary Examiner* — Robert A Vetere
(74) *Attorney, Agent, or Firm* — Shuttleworth & Ingersoll, PLC; Brett Papendick

(57) ABSTRACT

A method involves the coating of a metallic substrate with a blasting medium through sandblasting or equivalent techniques. The blasting medium is preferably a powder made of silicon nitride (or other ceramic or engineering materials). The sandblasting process allows the silicon nitride powder to form a loosely packed layer on the substrate. With additional treatment via rolling and/or sliding action against a secondary body in the presence of a liquid lubricant, the loosely packed particle layer turns into a flattened surface matrix consisting of particle clusters and irregular cavities. The silicon nitride particles are spontaneously attached to the substrate surface without the use of an adhesive agent which subsequently leads to the formation of a surface matrix exhibiting a chaotic hybrid topography with zero tensile stress when subjected to rolling/sliding contact pressure. This cluster-cavity matrix can evolve continuously (thus dynamic) and is immune to debris indentation from dirty lubricants. It is a complex, self organizing, and adaptive system. The practical value of this invention is to greatly enhance the fatigue and wear life of the bearing substrate (Continued)

and other objects coming into contact with the treated substrate.

12 Claims, 10 Drawing Sheets

(51) Int. Cl.
    *F16C 33/66*     (2006.01)
    *C10M 103/00*     (2006.01)
    *F16N 15/00*     (2006.01)
    *B05D 5/00*     (2006.01)
    *F16C 33/62*     (2006.01)
    *F16C 33/04*     (2006.01)

(52) U.S. Cl.
    CPC .......... *F16C 33/62* (2013.01); *F16C 33/6696* (2013.01); *F16N 15/00* (2013.01); *F16C 33/043* (2013.01); *Y10T 428/12139* (2015.01); *Y10T 428/24355* (2015.01); *Y10T 428/2982* (2015.01)

(56) References Cited

U.S. PATENT DOCUMENTS

| | | | |
|---|---|---|---|
| 9,188,874 | B1 * | 11/2015 | Johnson .............. G03F 7/70291 |
| 2004/0115477 | A1 * | 6/2004 | Nesbitt ................. A47J 36/025 |
| | | | 428/692.1 |

OTHER PUBLICATIONS

Kim et al. (Hierarchial Structure of porous Silicon nitride Ceramics with Aligned Pore Channels Prepared by Ice-Templating and Nitridation of Silicon Powder, 2015, Int J. Appl. Ceram, 12 [5] 921-931 (Year: 2015).*
Kenneth K. Chao and Costandy S. Saba, Pretreatment of Steel Racetracks by using a Sand-Blasting Technique with a Special Emphasis on Si3N4 Powder—Part One, Tribology Transactions, vol. 52 (2009), pp. 96-105.
Rao S. Zhou, Surface Topography and Fatigue Life of Rolling Contact Bearings, Tribology Transactions, vol. 36, Issue 3 (1993), pp. 329-340.
E. Ionnides, E. Beghini, B. Jacobson, G. Bergling and J. Goodall Wuttkowski, Cleanliness and Its Importance to Bearing Performance, Lubrication Engineering, vol. 49, Issue 9 (Sep. 1993), pp. 657-663.
R. S. Sayles, J. C. Hamer, and E. Ionnides, The Effect of Particulate Contamination in Rolling Bearings—A State of the Art Review, Proc. Inst. Mech. Engrs, vol. 204 (1990), pp. 29-36.
Costandy S. Saba, Impact of Microfiltration on Spectrometric Oil analysis, Proceedings of the 44th Meeting of MFPG, pp. 151-160, Virginia Beach, VA, Apr. 3-5, 1990.
Hans-Karl Lorosch, Research on Longer Life of Rolling-Element Bearings, Lubrication Engineering, vol. 41, Issue 1 (Jan. 1985), pp. 37-43.
Michael Marder and Jay Fineberg, How Things Break, Physics Today, vol. 49 (Sep. 1996), pp. 24-29.
Yoshio Kumanda, Katsuyuki Hashizume, and Yoshitsugu Kimura, Performance of Plain Bearings with Circumferential Microgrooves, Tribology Transactions, vol. 39, Issue 1 (1996), pp. 81-86.
Yoshinobu Akamatsu, Noriyuki Tsushima, Toshihide Goto and Kenji Hibi, Influence of Surface Roughness Skewness on Rolling Contact Fatigue Life, Tribology Transactions, vol. 35, Issue 4 (1992), pp. 745-750.
L. G.Hector, Jr. and S. Sheu, Focused Energy Beam Work Roll Surface Texturing Science and Technology, Journal of Materials Processing & Manufacturing Science, vol. 2 (Jul. 1993), pp. 63-117.
G. Ryk, Y. Kligerman, I. Etsion and A. Shinkarenko, Experimental Investigation of Partial Laser Surface Texturing for Piston-Ring Friction Reduction, Tribology Transactions, vol. 48 (2005), pp. 583-588.

G. C. Barber and H. Gao, Experimental Study on the Friction Characteristics of Lasertex Steel Sheets During Metal Forming Process, Tribology Transactions, vol. 48 (2005), pp. 245-249.
Andriy Kovalchenko, Oyelayo Ajayi, Ali Erdemir and George Fenske, The Effect of Laser Texturing of Steel Surfaces and Speed-Load Parameters on the Transition of Lubrication Regime from Boundary to Hydrodynamic, Tribology Transactions, vol. 47 (2004), pp. 299-307.
Xiaolei Wang, Huan Zhang and Stephen M. Hsu, The Effects of Dimple Size and Depth on Friction Reduction Under Boundary Lubrication Pressure, Proceedings of the STLE/ASME International Joint Tribology Conference, IJTC2007-44235, San Diego, California, Oct. 22-24, 2007.
Ramin Rahmani, Ayoub Shirvani and Hassan Shirvani, Optimization of Partially Textured Parallel Thrust Bearings with Square-Shaped Micro-Dimples, Tribology Transactions, vol. 50 (2007), pp. 401-406.
Kenneth K. Chao and Costandy S. Saba, Effects of Lubricant Borne Solid Debris in Rolling Surface Contacts, Tribology Transactions, vol. 39, Issue 1 (1996), pp. 13-22.
R. S. Sayles and P. B. Macpherson, Influence of Wear Debris on Rolling Contact Fatigue, Rolling Contact Fatigue Testing of Bearing Steels, Hoo, J. J. C., ed. ASTM STIP 771, American Society for Testing and Materials (1982), pp. 255-274.
Y. P. Chiu, The Role of Residual (or Internal) Stress on Microspalling of Rolling Contacts, International Rolling Element Bearing Symposium, Orlando, Florida, Apr. 8-11, 1991, pp. 1-15.
Kenneth K. Chao and Costandy S. Saba, Pretreatment of Steel Racetracks Using Sand-Blasting Technique with Special Emphasis on Si3N4 Powder—Part Three, Accepted for Publication in Tribology Transactions, vol. 53, Issue 3, (May 2010).
P. W. Anderson, More is Different, Science, vol. 177, No. 4047 (Aug. 1972), pp. 393-396.
Stuart A. Kauffman, Antichaos and Adaptation, Scientific American (Aug. 1991), pp. 78-84.
Mitchell M. Waldrop, Complexity: the Emerging Science at the Edge of Order and Chaos, Touchstone, Simon & Schuster, Inc. (1992), ISBN 0-671-76789-5, pp. 10-13.
Russell Ruthen, Adapting to Complexity, Scientific American (Jan. 1993), pp. 130-140.
Per Bak, Chao Tang and Kurt Wiesenfeld, Self-Organized Criticality, Physical Review A, vol. 38, No. 1 (Jul. 1988), pp. 364-374.
Per Bak and Kan Chen, Self-Organized Criticality, Scientific American (Jan. 1991), pp. 46-53.
Kenneth K. Chao, Douglas K. Toth and Costandy S. Saba, An Integrated Test Method for HighTemperature Liquid Lubricants: Dynamic Test, Tribology Transactions, vol. 37, Issue 2 (1994), pp. 293-298.
Y. P. Chiu, P. K. Pearson, M. Dezzani and H. Daverio, Fatigue Life and Performance Testing of Hybrid Ceramic Ball Bearings, Lubrication Engineering, vol. 52, Issue 3 (Mar. 1996), pp. 198-204.
Emilia Assenova and Mara Kandeva, Self-Organization Aspects in Tribosystems, The Annals of University Dunarea De Jos of Galati, Fascicle VIII, Tribology (2003), pp. 25-28.
Riley, Frank L., Silicon Nitride and Related Materials, Journal of the American Ceramic Society, vol. 83, No. 2, Feb. 2000, United Kingdom.
Yen, Bing K., Microstructure and Properties of Ultra-Thin Amorphous Silicon Nitride Protective Coating, SLAC-PUB-10008, Jun. 2003, Stanford, CA.
Kenneth K. Chao and Costandy S. Saba, Pretreatment of Steel Racetracks by Using Sand-Blasting Technique with a Special Emphasis on Si3N4 Powder—Part Two, Tribology Transactions, vol. 52 (2009), pp. 632-642.
Paul Sutor, Solid Lubricants: Overview and Recent Developments, MRS Bulletin, (May 1991), pp. 24-30.
D. A. Ersoy and M. J. McNALLAN, Tribology Properties of Carbon Coatings Produced by High Temperature Chlorination of Silicon Carbide, Tribology Transactions, vol. 43, Issue 4 (2000), pp. 809-815.
E. Konca, Y. T. Cheng, A. M. Weiner, J. M. Dasch and A. T. Alpas, The Role of Hydrogen Atmosphere on the Tribological Behavior of

(56) References Cited

OTHER PUBLICATIONS

Non-Hydrogenated DLC Coatings against Aluminum, Tribology Transactions, vol. 50 (2007), pp. 178-186.
Hiromasa Ishikawa, Hiroshi Ishii and Takeshi Uchida, An Analysis of Deformation of Steel Coated With Ceramics in Rolling-Sliding Contact, Transactions of the Asme, 113, pp. 349-354, Apr. 1991.
Simon C. Tung and Hong Gao, Tribology Investigation of Piston Ring Coatings Operating in an Alternative Fuel and Engine Oil Blend, Tribology Transactions, vol. 45, Issue 3 (2002), pp. 381-389.
Kevin C. Radil and Christopher Dellacorte, The Effect of Journal Roughness and Foil Coatings on the Performance of Heavily Loaded Foil Air Bearings, Tribology Transactions, vol. 45, Issue 2 (2002), pp. 199-204.
W. J. Lackey, D. P. Stinton, G. A. Cerny, A. C. Schaffhauser, and LL. Fehrenbacher, Ceramic Coatings for Advanced Heat Engines—A Review and Projection, Advanced Ceramic Materials, vol. 2, Issue 1 (1987), pp. 24-30.
Sture Hogmark and Per Hedenqvist, Tribological Characterization of Thin, Hard Coatings, Wear, 179 (1994), pp. 147-154.
Irwin L. Singer, Solid Lubricating Films for Extreme Environments, Mat. Res. Soc. Symp. Proc., vol. 140 (1989), pp. 215-226.
M. Koizumi and M. Nino, Overview of FGM Research in Japan, MRS Bulletin, vol. 20 (Jan. 1995), pp. 19-21.
Xuejun Zhai, L. Chang, M. R. Hoeprich and H. P. Nixon, On Mechanisms of Fatigue Life Enhancement by Surface Dents in Heavily Loaded Rolling Line Contacts, Tribology Transactions, vol. 40, Issue 4 (1997), pp. 708-714.

\* cited by examiner

PROCESS TO CREATE A SELF-ORGANIZING SURFACE MATRIX

CROSS-REFERENCE TO RELATED APPLICATIONS

This application is a divisional of U.S. patent application Ser. No. 12/650,100 filed Dec. 30, 2009, which application is incorporated by reference herein.

BACKGROUND

Surface defects and roughness are two essential causes for the fatigue failure of certain parts coming into contact with one another including rolling-contact elements such as roller bearings. In order to assure the longevity of such parts, technology has been developed to minimize both surface defects and roughness of machined bearing parts, albeit such technology is costly in general. No matter how perfect a finished surface might be, once placed into service it is likely to be impaired by solid debris present in a lubricating fluid typically utilized to reduce wear. To avoid this, strict requirements of lubrication filtration must be followed, which requirements are not always practical, especially with regard to system diagnostics. Further, a paramount concern is usually not the insufficient filtration but the initial particle contamination before the steady state of lubricant cleanliness can be established. As has been found in many cases, a single abusive particle is capable of doing damage to the contacting parts and materials.

Currently there exist several performance-enhancing techniques, including coatings, designed to reduce friction, wear, corrosion, erosion, and thermal degradation of metal surfaces. A fundamental obstacle is a coating binding problem, whether due to the cohesive integrity of a coating itself or adherence of the applied coating on the metallic substrate. One difficulty stems from upholding both intra-phase cohesion and inter-phase adhesion simultaneously because these two forces oppose one another with the stronger causing the weaker to fail. Symptoms of coating breakdown can usually be attributed to the differential material warp within the coating/substrate interface region due to thermal expansion, mechanical deformation, and even chemical aging. The very existence of a ubiquitously bonded rigid film with its own distinctive properties can be the backdrop for most coating failures. Newcomers such as graded coatings are being developed to smooth the surface-to-substrate transition but with much higher costs.

Ordinary engineering surfaces are built with all-bonded (static) solid media; therein the presence of contact tensile stresses is inevitable. Tensile stress, which stretches and breaks molecular bonds, is the culprit of material wear and fatigue spallation. Another setback of the all-bonded solid medium is that fatigue cracks can expand unchecked within it.

It is therefore an object of the present invention to provide a process for covering a substrate with a dynamic layer of material which will increase the fatigue and wear life of the substrate.

It is further an object of the present invention to provide a process for saturating a substrate with a surface matrix (layer) of particle clusters and irregular cavities exhibiting a chaotic hybrid topography with zero tensile stress.

It is another object of the present invention to create a surface matrix with dynamic cavities and particle clusters to accommodate liquid lubricant as well as debris particulates so that the matrix is immune to particulate indentation.

It is another object of the present invention to provide a dynamic surface matrix (layer) that can be defined as a complex, self-organizing, and adaptive system.

SUMMARY OF THE INVENTION

The present invention provides a process for coating a substrate with a dynamic layer consisting of particle clusters and irregular cavities to improve the fatigue and wear life of the substrate and other objects coming into contact with the treated substrate. An airblasting process, sandblasting process or other similar mechanism can be utilized to bombard the substrate with hard particles with a sufficient force such that the hard particles form a loosely packed layer upon the substrate. With additional "run-in" treatment via rolling and/or sliding contact against a secondary body in the presence of a liquid lubricant, those particles being compressed together under load would form particle clusters (load carrying elements of the surface) whereas uncompressed or loose particles would be washed away by liquid lubricant to leave behind naturally irregular cavities (or porosity). As a result, a cluster-cavity matrix with flattened/aligned topographic peak areas develops.

The preferred substrate is a metal which exhibits a particular fatigue and wear life. The treatment of a first side of the metal results in a prolonged fatigue and wear life of the metal, which also helps to extend the fatigue and wear life of objects coming into contact with the treated metal. The preferred hard particles are $Si_3N_4$, silicon nitride, which are airblasted or sandblasted onto the substrate, although other ceramic or engineering materials in powder forms may be used as well. The silicon nitride particles are sandblasted for a sufficient duration such that they spontaneously form a loosely packed layer of silicon nitride particles on the substrate. The layer, after being worked via a rolling and/or sliding action in a liquid lubricant, develops a surface matrix containing a plurality of cavities and cohesively linked (compressed) particle clusters with flattened/aligned peak areas.

In the case where the substrate is a steel race and the object coming into contact with the treated steel race is a ball bearing (i.e., steel or silicon nitride balls), the cavities within the matrix are substantially smaller than the Hertzian elastic contact area of the bearing surface such that the bearing surface can roll or slide smoothly over the flattened matrix containing irregular cavities.

The cavities also allow contaminants smaller than the cavities which may be present on the surface or in the lubricant to be accommodated within the cavities. Moreover, because individual particles are not rigidly bonded together within the clusters, they are able to move around and self-adjust to cope with the environmental variables such as varying loading pressures and contact with solid debris. Therefore the surface matrix is a complex, self-organizing, and adaptive system.

DETAILED DESCRIPTION

Figure 1:
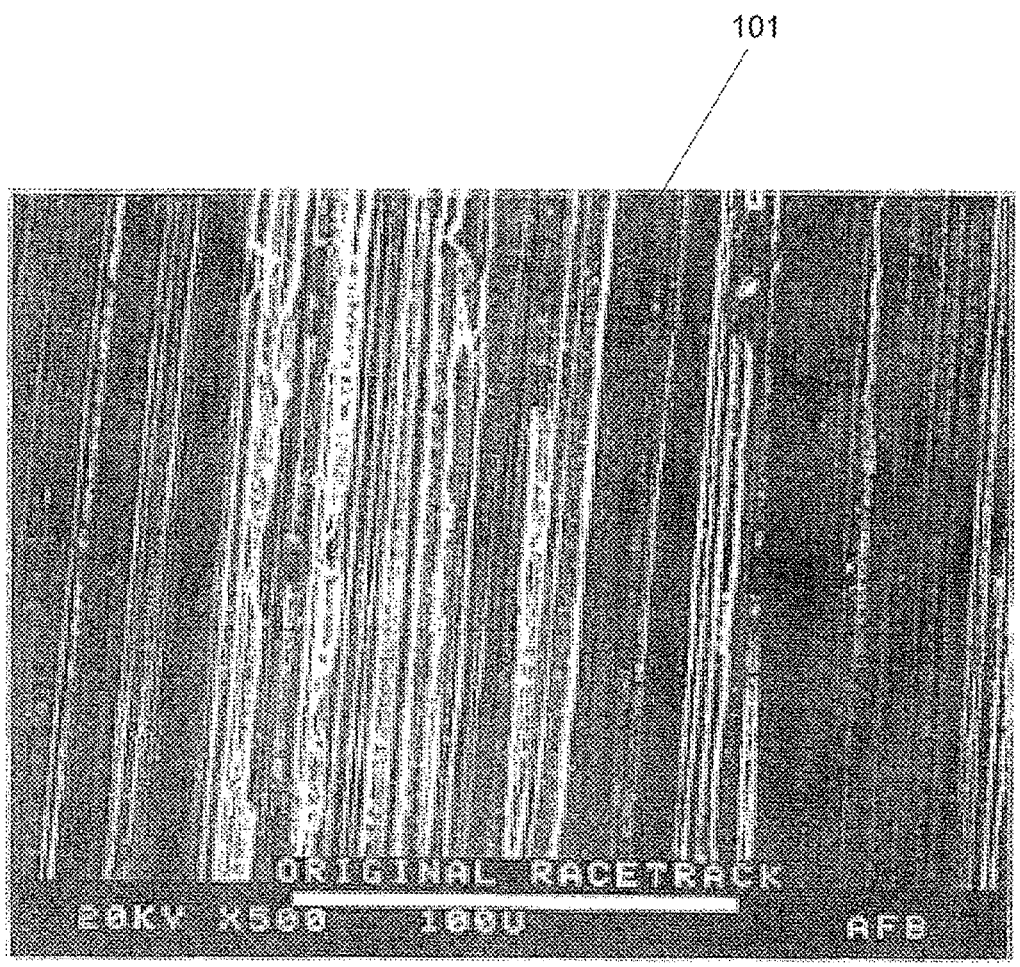
FIG. 1 is a scanning electron microscope (SEM) photomicrograph of an original (untreated) steel substrate. Magnification=500×.
Figure 3:
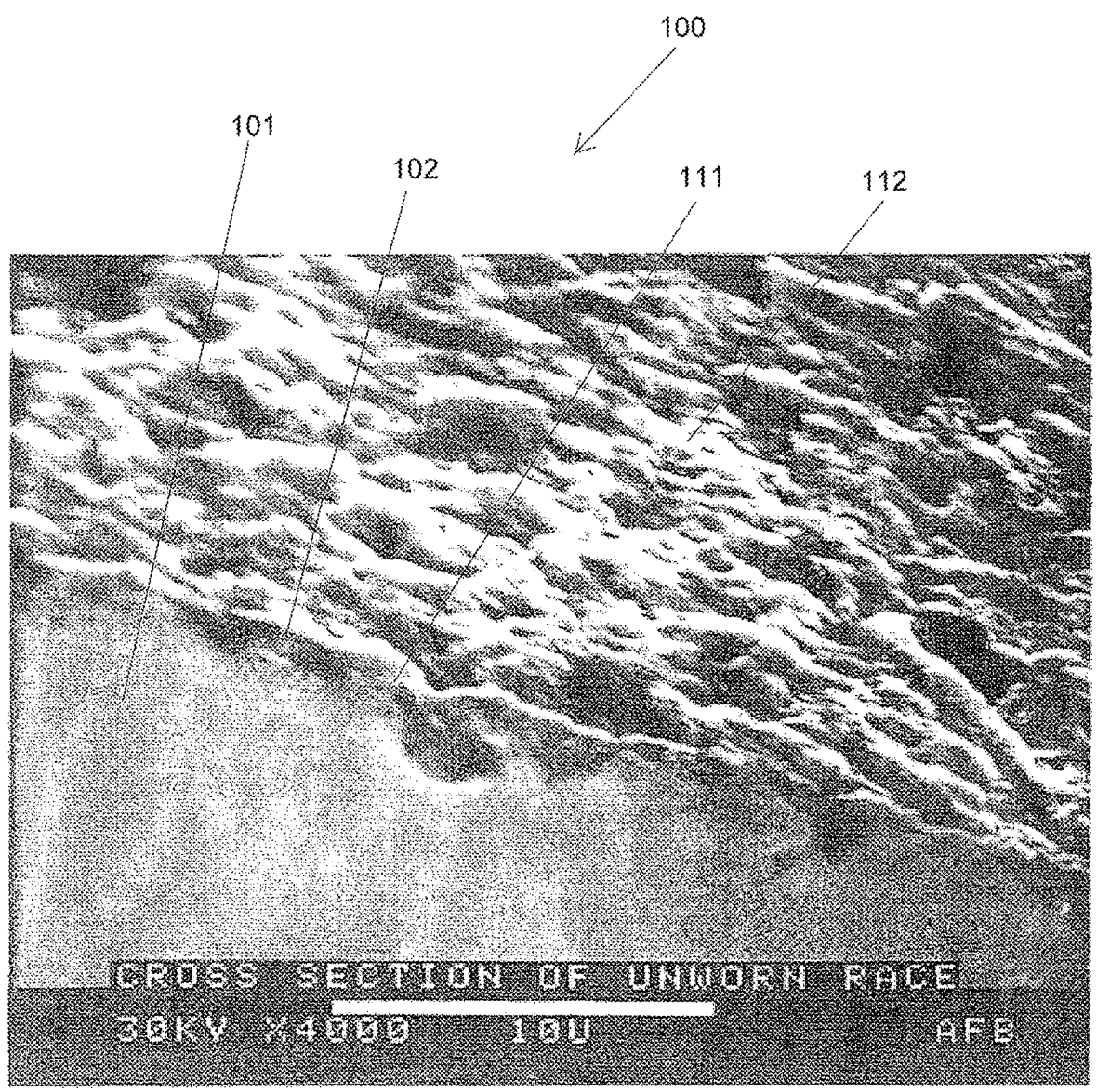
FIG. 3 is a cross-sectional view of FIG. 2 showing a substrate covered with a loosely packed layer of silicon nitride particles. Magnification=4000×.

FIG. 1 shows a photomicrograph of an untreated substrate 101. FIG. 3 shows an object 100 comprising a substrate 101 and a blasting medium 102 which serves as a surface treating medium. The substrate 101 is preferably a metal, such as steel, but the substrate 101 may be any material to which the blasting medium 102 will adhere spontaneously. The blasting medium 102 is preferably one which is self-attaching and may be sandblasted on the substrate 101 at sufficient pressure and velocity to promote adherence of the blasting medium 102 to the substrate 101 without the use of an adhesive agent.

Figure 2:
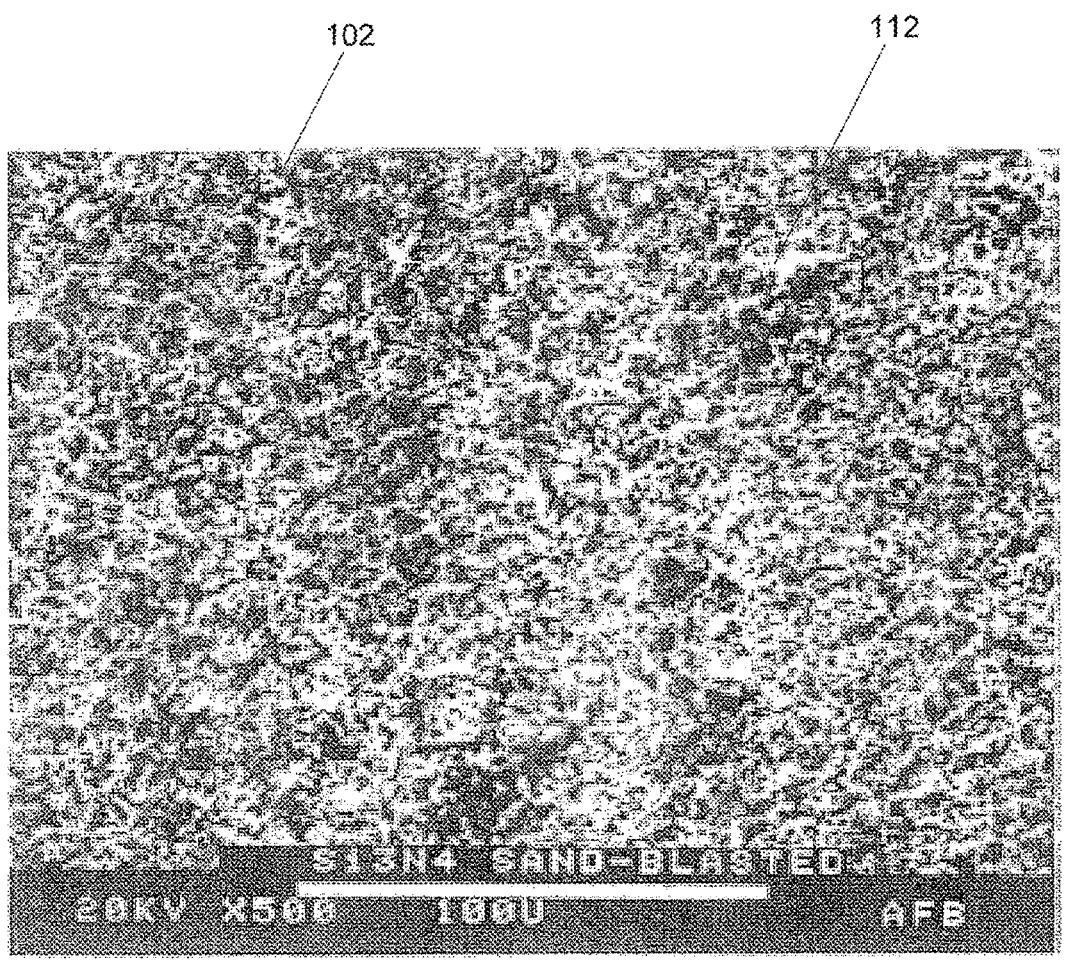
FIG. 2 is a SEM photomicrograph of a loosely packed particle layer on a steel substrate after the substrate underwent the initial sandblasting treatment with silicon nitride particles. Magnification=500×.

In FIGS. 2 and 3, the preferred embodiment has the substrate 101 made of metal. Additionally, the blasting medium 102 is partially composed or entirely composed of silicon nitride particles 112. The substrate 101 is sandblasted using the silicon nitride particles 112 in a powder form. In the preferred embodiment, the silicon nitride particles 112 are contained in powder form of primarily 1 to 2 microns or roughly the equivalent of 7000 mesh size. The silicon nitride particles 112 are attached to the substrate 101 via the airblasting or sandblasting method with an air jet pressure of roughly 80 psi to form a loosely packed particle layer 111. The blasting medium 102 can also be made of different powder materials. Similarly, the silicon nitride particles 112, or other blasting medium 102, can be of varying sizes and applied at different pressures as long as the particle layer 111 or blasting medium 102 attach to the substrate 101.

Figure 9:
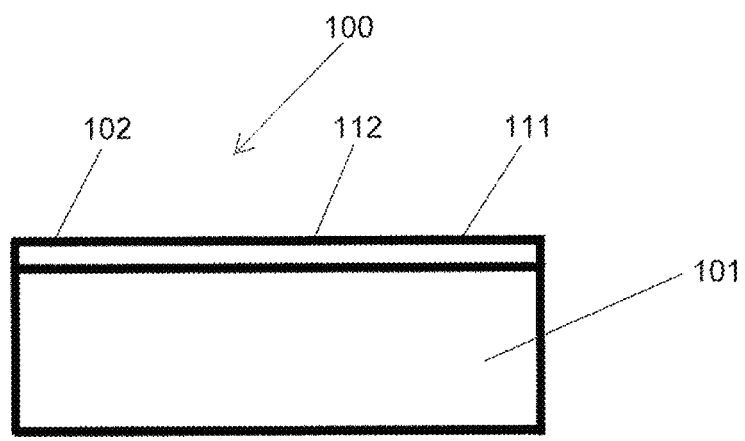
FIG. 9 is a side view of a substrate coated with silicon nitride particles to form a layer on the substrate.

In FIGS. 3 and 9, the preferred embodiment has the silicon nitride particles 112 adhering to the substrate 101. A sufficient amount of silicon nitride particles 112 are used to treat the substrate 101 such that individual particles 112 completely cover the substrate 101 and form a loosely packed particle layer 111.

Figure 4:
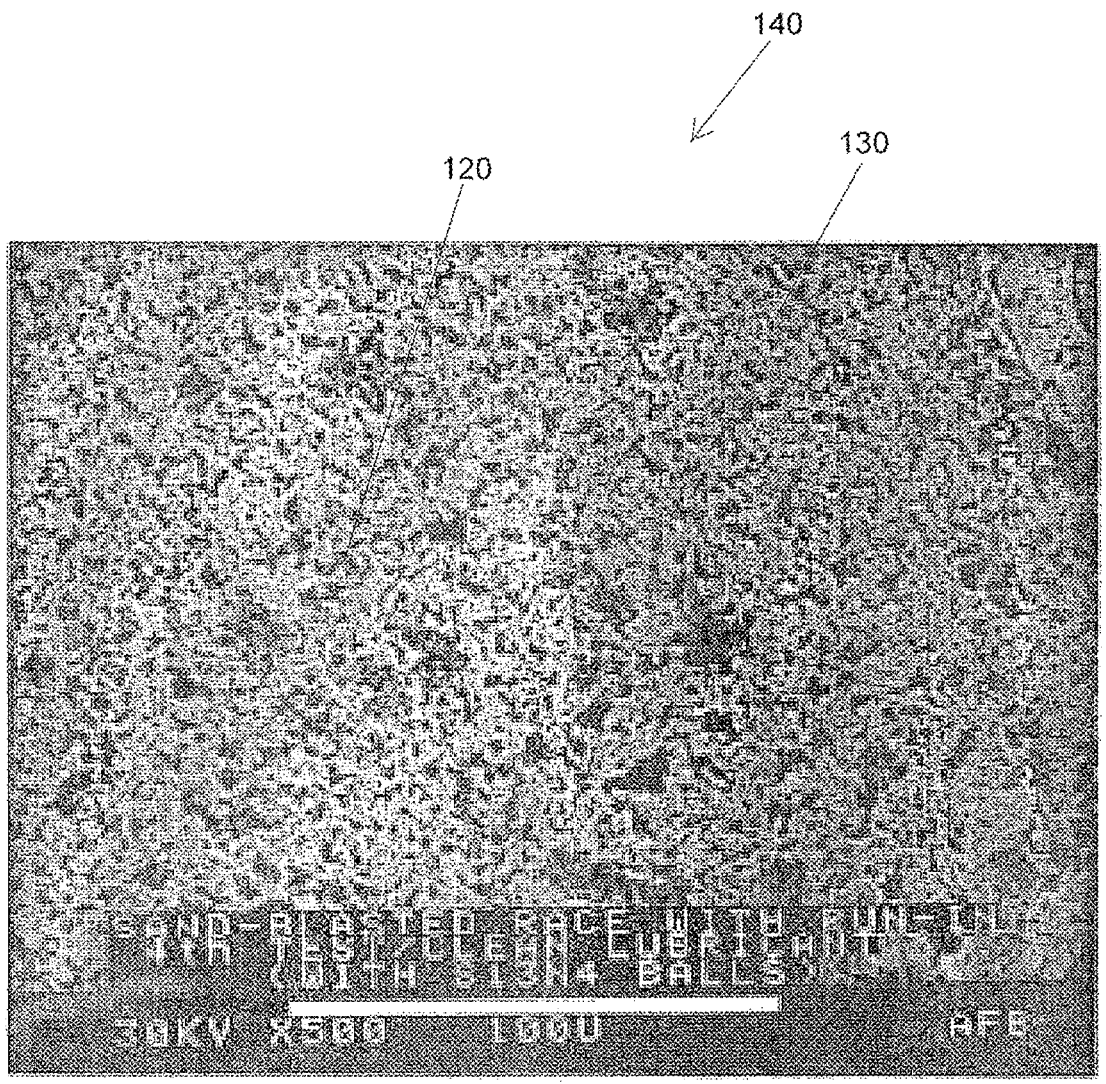
FIG. 4 is a SEM photomicrograph of a sandblasted substrate (such as FIG. 2) after it has been subjected to additional rolling treatment against silicon nitride balls in the presence of a "clean" liquid lubricant. Magnification=500×.
Figure 5:
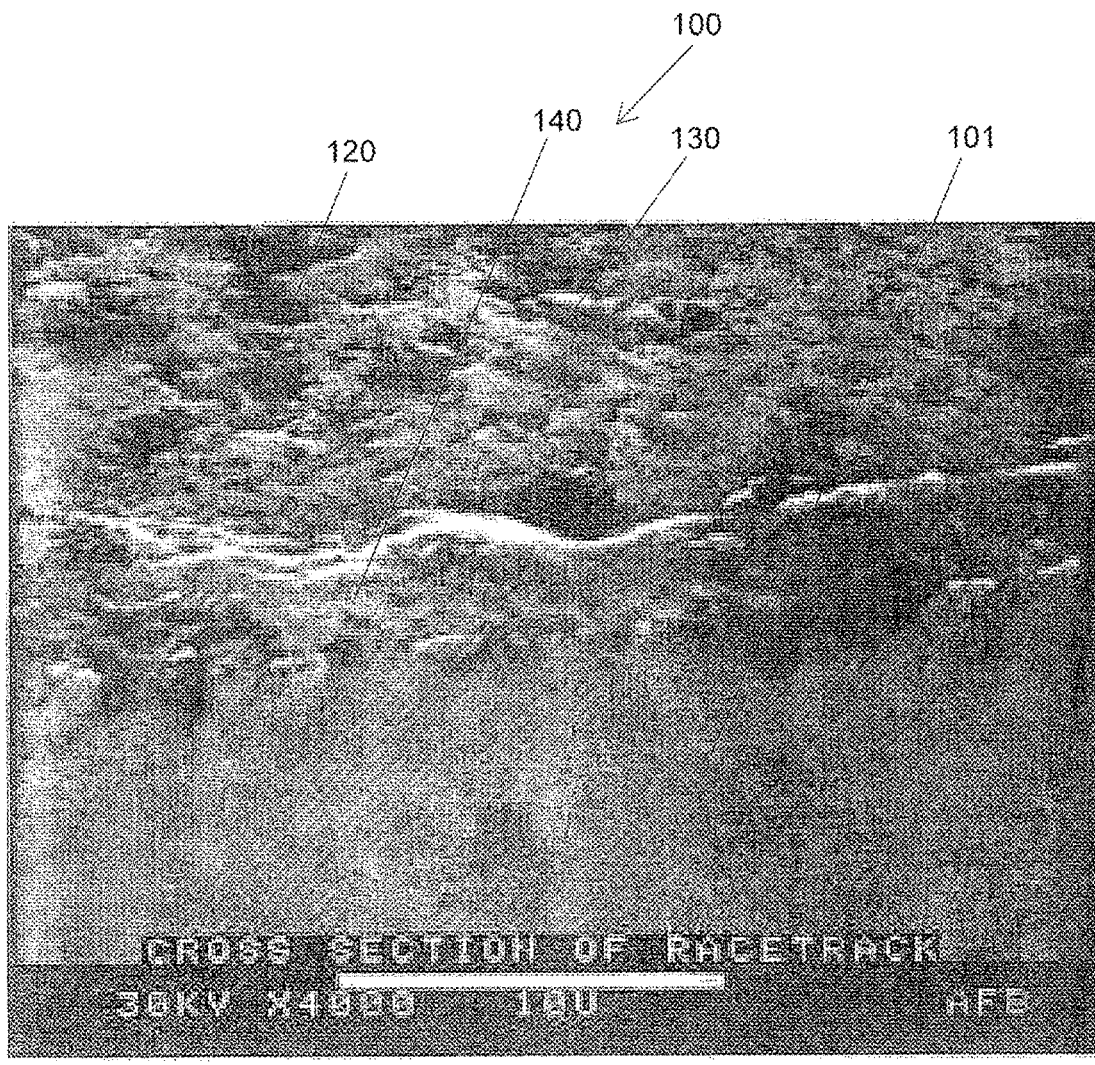
FIG. 5 is a cross-sectional view of FIG. 4 showing a flattened topography (or surface matrix) consisting of particle clusters and irregular cavities. Magnification=4000×.
Figure 10:
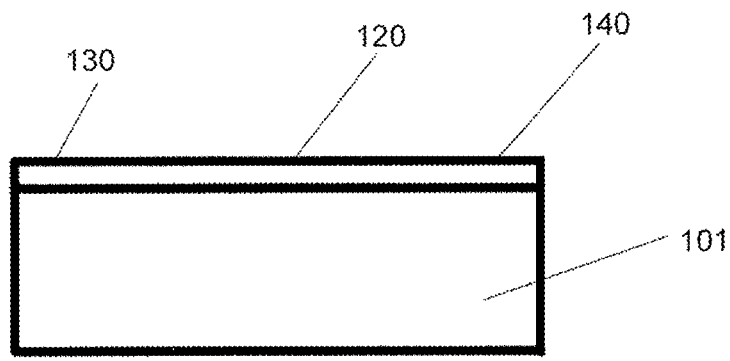
FIG. 10 is a side view of a substrate coated with silicon nitride particles which was then subjected to rolling and/or sliding to produce a matrix of irregular cavities and particle clusters.

FIGS. 4, 5, and 10 show a flattened surface matrix 140 consisting of irregular cavities 120 and particle clusters 130 as a result of initial rolling action (or "run-in") by silicon nitride balls on the loosely packed layer (FIGS. 2 and 3) in the presence of a "clean" liquid lubricant. The cavities 120, generated from the removing of uncompressed/loose particles 112 by liquid lubricant, are preferably less than 20 microns across, although larger cavities may be suitable for certain applications.

As the preferred embodiment contains no adhesive agent, the flattened surface matrix 140 involves the individual silicone nitride particles 112 in compressed cluster form 130 (load carrying elements of the surface). The cavities 120 provide sufficient room for spatial yielding and reorientation among the autonomous particles 112 in the form of clusters 130 when under heavy loading, and are a valuable mechanism for local stress relief and surface conformity adjustment.

The cavities 120 within the surface matrix 140 can work in concert with a lubricant (not shown). The lubricant can be a petroleum based liquid such as a motor oil. The cavities 120 retain a portion of the liquid lubricant, adding to the hydrodynamic lubrication aspect of the matrix 140. The cavities 120 as well as the matrix 140 retain the liquid lubricant better than the untreated substrate 101 of FIG. 1 and thus enhance the density of oil pockets within the contact ellipse of a ball bearing or some other object coming into contact with the matrix 140.

Additionally, the cavities 120 provide a void for holding contaminants that can be present in the lubricant or can become present in the lubricant. The voids provided by the cavities 120 allow small particles inside a lubricant to be trapped and contained within the cavities 120. Another object coming into contact with the matrix 140 will have less chance of damaging by the contaminants and solid debris, particularly small particles of contaminants and solid debris which are trapped in the cavities 120. Instead, the other object will push against, or roll, in the case of a ball bearing, on the matrix 140. The relative small size of the cavities 120 and the substantially larger Hertzian contact area of the other object prevent the other object/surface from slipping into the cavities 120 as the contact area will not feel the physical presence of cavities. Furthermore since individual particles 112 are autonomous by nature, they can self-adjust and adapt to sporadic debris indenting. Consequently matrix 140 is immune to random indentation by solid debris present in the lubricant. A relatively coarse oil filter (not shown) can be used in conjunction with the invention to remove larger contaminants and solid debris from the lubricant.

FIG. 5 is a side-view photomicrograph showing a substrate 101 treated with silicon nitride particles 112 (FIG. 3) after it underwent exposure to a rolling contact against a silicon nitride ball bearing in the presence of a "clean" liquid lubricant. As a result, a flattened surface matrix 140 is formed which comprises particle clusters 130 and irregular cavities 120 as depicted in this figure. The silicon nitride balls were used in conjunction with a commercial multi-specimen friction and wear test machine modified to accommodate a thrust ball bearing. Prior to the rolling (or sliding) action, the loosely packed particle layer 111 exhibits varying topographic heights (FIG. 3). After the rolling (or sliding), the heights of the resulting matrix 140 are uniformly aligned/flattened, and those uncompressed or loose silicon nitride particles 112 are removed to create cavities 120 (FIG. 5). It should be noted that since individual particles 112 are not bonded together by adhesive agent, they can not withstand tensile stress. As a result, matrix 140 selectively permits compressive stress (load) while barring tensile stress (wear). Roughly speaking, stresses can be induced through deformation or volume change inside a material. If the resulting molecular/atomic bonds were stretched then there is tensile stress, and if bonds were compressed then there is compressive stress. Fatigue cracking and wear of a solid material are usually caused by repeated stretches, not compresses, of its molecular/atomic bonds until they totally break apart. FIGS. 4 and 5 also demonstrate the ability of a majority of the silicon nitride particles to remain adhered to the substrate 101 after exposed to rolling (or sliding) action.

Figure 6:
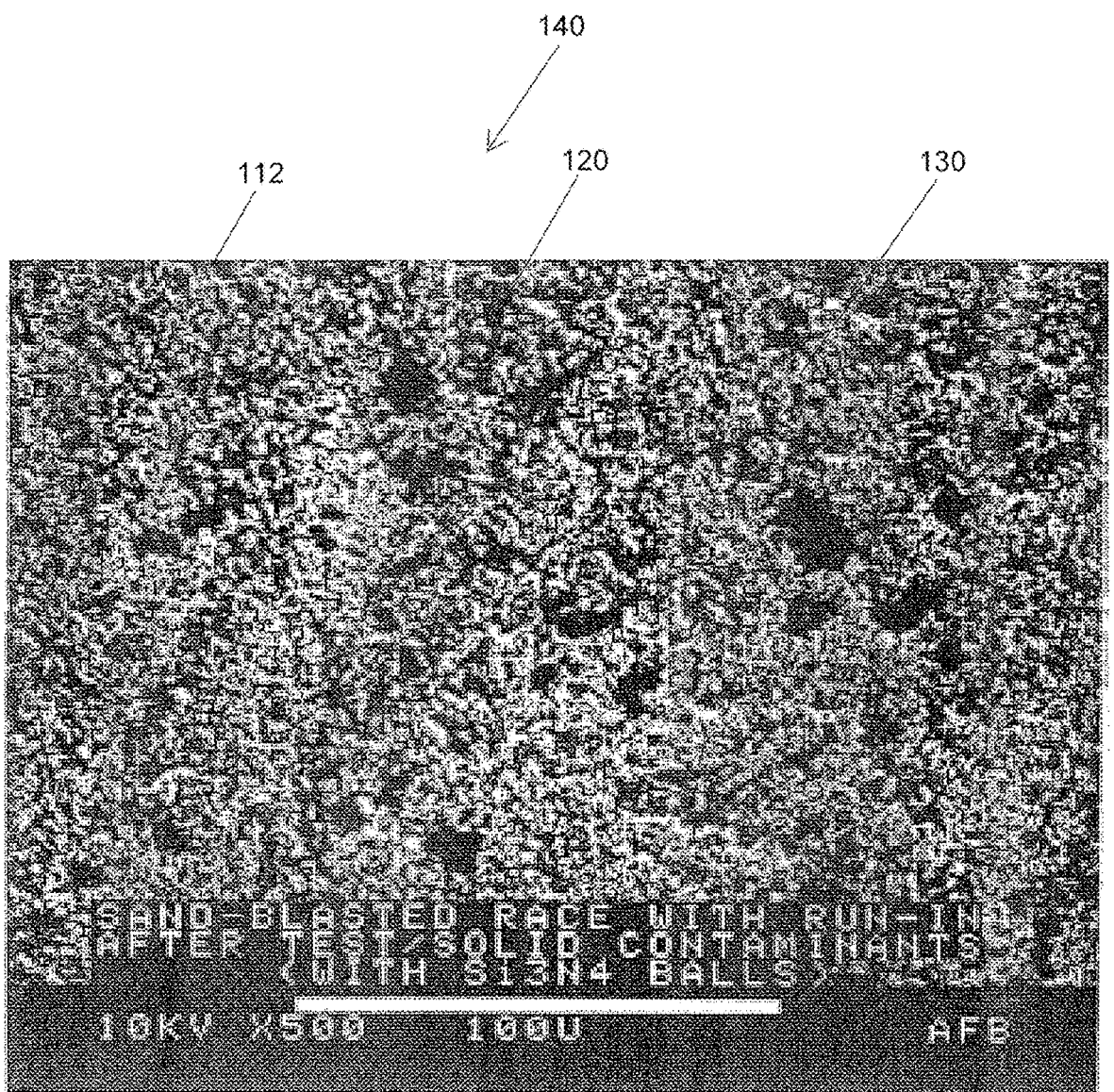
FIG. 6 is a SEM photomicrograph of a worn surface matrix (such as FIG. 4) after it underwent further rolling action by silicon nitride balls in the presence of a "debris contaminated" liquid lubricant. Magnification=500×.
Figure 7:
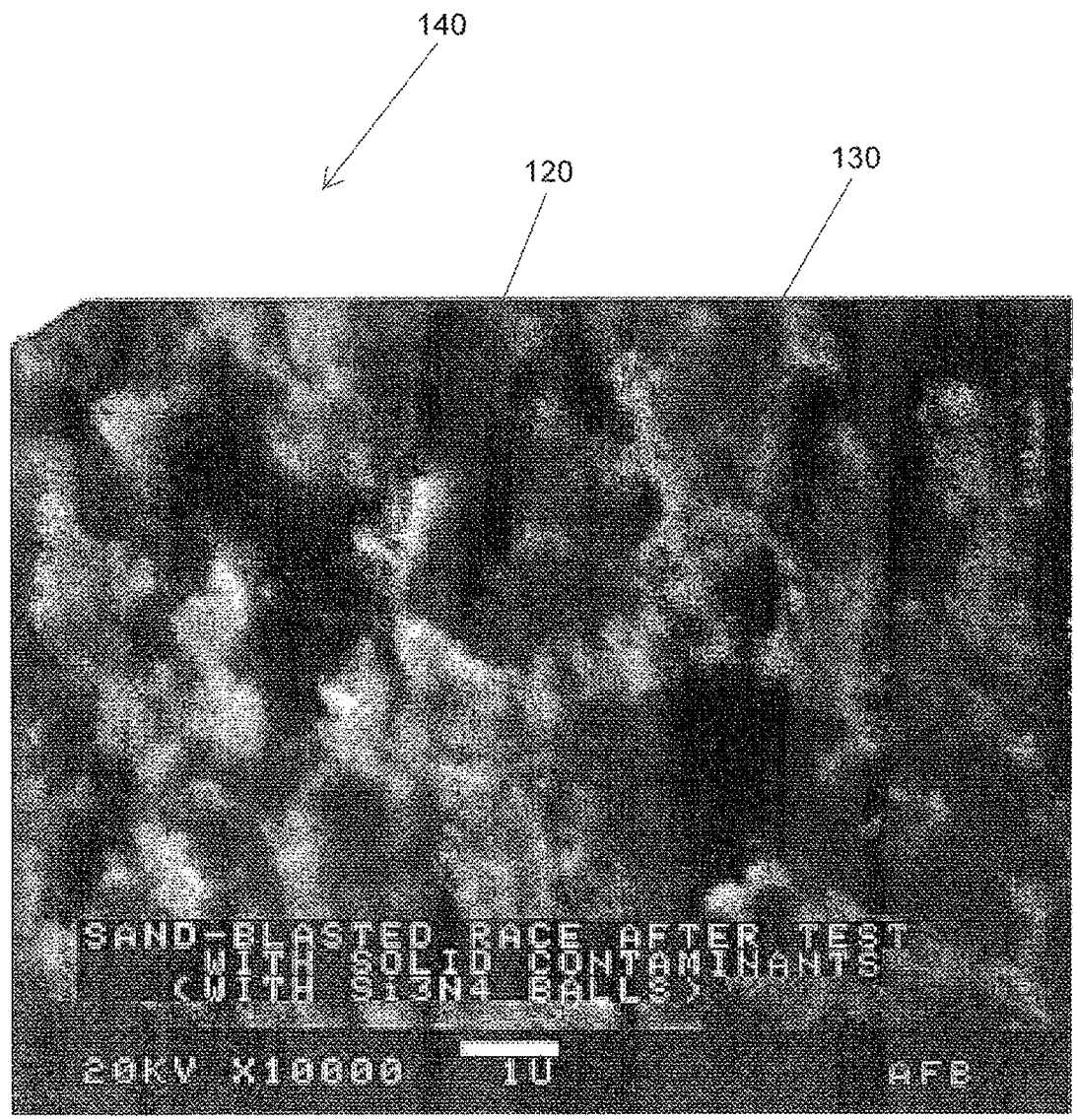
FIG. 7 is a higher magnification photo (20 times) of FIG. 6 showing the detail features of a self-organizing surface matrix consisting of particle clusters and irregular cavities. Magnification=10000×.

FIGS. 6 and 7 illustrate a cluster-cavity matrix 140 after it underwent further rolling action by silicone nitride balls in the presence of a "debris contaminated" liquid lubricant. FIG. 7 is a higher magnification photo (20 times) of FIG. 6 showing the detail features of particle clusters 130 and irregular cavities 120. The particle clusters 130 are made of individual particles 112. Because the individual particles 112 are not rigidly bonded together (by adhesive agent for instance), they can move around and adjust to the changes in tribological condition at hand such like debris indentation as manifested by FIGS. 6 and 7. In other words, matrix 140 is an adaptive system which is immune to random indentation from lubricant-borne solid debris.

Figure 8:
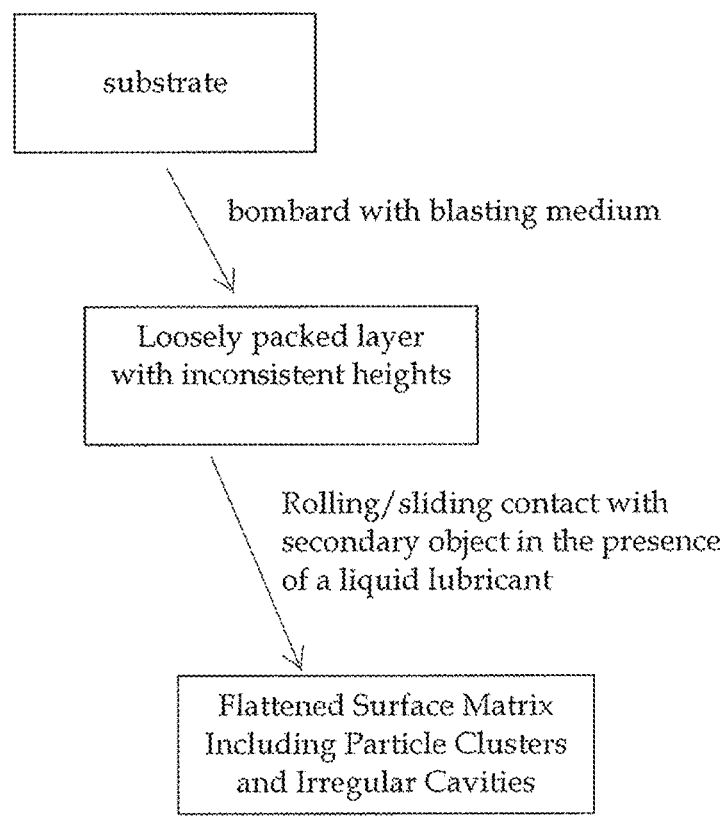
FIG. 8 is a flow chart demonstrating a method of producing a self-organizing surface matrix on a substrate.

FIG. 8 is a flow chart detailing the method for treating a substrate 101 with a blasting medium 102 to create a dynamic surface matrix 140 which includes particle clusters 130 and irregular cavities 120. First, the substrate is bombarded with an appropriately selected blasting medium (preferably in powder form) at sufficient pressure and velocity to allow the blasting medium to spontaneously adhere to the substrate to form a new object comprised of the substrate and a layer of loosely packed particles. With the additional "run-in" treatment via rolling and/or sliding contact against a secondary body in the presence of a liquid lubricant, the surface layer turns into a dynamic matrix consisting of particle clusters and irregular cavities. This dynamic surface matrix exhibits a chaotic hybrid topography with zero tensile stress, is immune to debris indentation, and can be defined as a complex, self-organizing, and adaptive system. Chaotic hybrid topography is a newly developed concept by this inventor which basically combines a smooth surface (flattened/aligned peak areas of the matrix) with a rough surface (cavity/porosity of the matrix) that is arranged in a naturally random fashion. Examples of chaotic hybrid topography are shown in FIGS. 4, 5, 6 and 7. On the other hand, a complex, self-organizing, and adaptive system is born from the Science of Complexity (also called Complexity Science).

Having thus described the invention in connection with the several embodiments thereof, it will be evident to those skilled in the art that various revisions can be made to the several embodiments described herein with out departing from the spirit and scope of the invention. It is my intention, however, that all such revisions and modifications that are evident to those skilled in the art will be included with in the scope of the following claims. Any elements of any embodiments disclosed herein can be used in combination with any elements of other embodiments disclosed herein in any manner to create different embodiments.

What is claimed is:

1. A method for treating a substrate, comprising:
bombarding the substrate with a surface treating medium to allow the s ace treating medium to adhere to the substrate;
the surface treating medium is $Si_3N_4$ particles;
the $Si_3N_4$ particles are a top layer of the surface;
wherein the adhered surface treating medium prolongs the fatigue and wear life of the substrate and demonstrates tribological characteristics;
the $Si_3N_4$ particles are attachable to the substrate without using an adhesive agent.

2. The method of claim 1, wherein:
the $Si_3N_4$ particles are a powder,
the substrate is a metal.

3. The method of claim 2, wherein:
the $Si_3N_4$ powder is sandblasted onto the metal;
the $Si_3N_4$ particles forming a packed particle layer on the metal;
the $Si_3N_4$ particles are cohesively connected with each other;
the $Si_3N_4$ particles substantially covers the metal substrate.

4. The method of claim 3, wherein:
the $Si_3N_4$ powder composing individual particles of less than 10 microns.

5. The method of claim 4 and further comprising the step of:
treating the packed particle layer on the substrate via rolling or sliding action against a secondary body in the presence of a liquid lubricant to create a flattened surface matrix containing particle clusters and irregular cavities.

6. The method of claim 5, wherein:
particle clusters are formed under compressive loading pressure;
particle clusters are made of individual autonomous $Si_3N_4$ particles which are cohesively connected with each other.

7. The method of claim 6, wherein:
uncompressed or loose $Si_3N_4$ particles are removed by the liquid lubricant to create irregular cavities inside the matrix.

8. The method of claim 7 wherein:
the irregular cavities retain a portion of the liquid lubricant;
the irregular cavities can accommodate lubricant-borne solid debris of similar sizes;
the irregular cavities provide room for spatial yielding and reorientation of silicon nitride particles within the surface matrix.

9. A method for treating a substrate, comprising the steps of:
Sandblasting the substrate with a blasting medium to facilitate the blasting medium to form a layer of cohesively connected particles such that the layer exhibits tribological properties and prolongs the fatigue and wear life of the substrate and secondary objects coming into contact with the layer:
the blasting medium forms a top layer of the surface;
the blasting medium is at least one of a ceramic material and an engineered material in powder form;
the blasting medium is attachable to the metal without using an adhesive agent.

10. The method of claim 9, wherein:
the blasting medium is $Si_3N_4$ particles;
the substrate is a metal.

11. The method of claim 10, further comprising the step of:
treating the layer by at least one of rolling and sliding against a secondary object,
wherein the at least one of rolling and sliding forms a matrix,
the matrix comprising particle clusters of $Si_3N_4$ and irregular cavities.

12. The method of claim 11 wherein:
the at least one of rolling and sliding is done in the presence of a liquid lubricate.

* * * * *